Nov. 10, 1931.  S. T. ADAIR ET AL  1,831,644
DEHYDRATION AND PURIFICATION OF $CO_2$
Filed Nov. 13, 1930
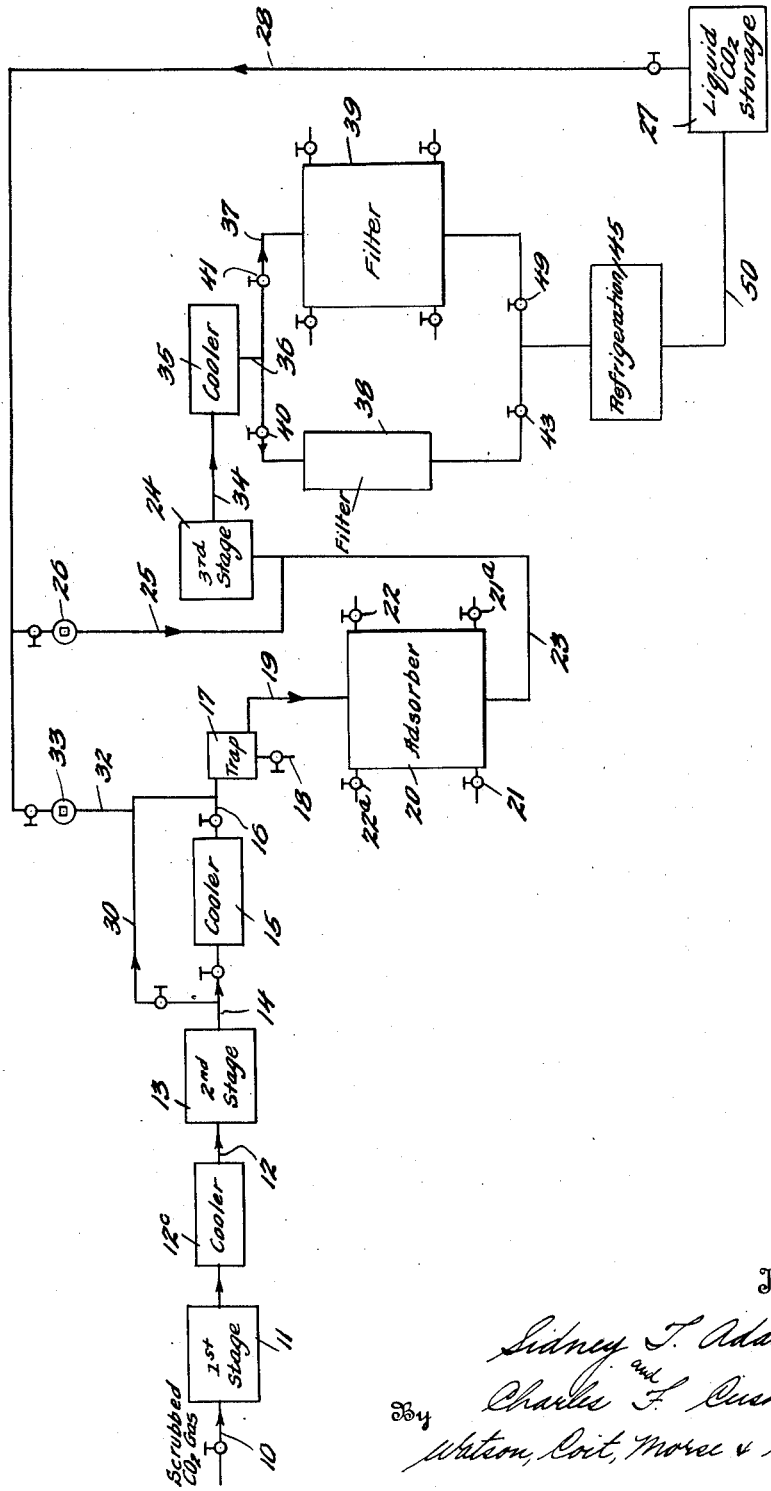
Inventors
Sidney T. Adair,
and
Charles F. Cushing,
By Watson, Coit, Morse & Grindle
Attorneys Patented Nov. 10, 1931

1,831,644

UNITED STATES PATENT OFFICE

SIDNEY T. ADAIR AND CHARLES F. CUSHING, OF BALTIMORE, MARYLAND

DEHYDRATION AND PURIFICATION OF CO₂

Application filed November 13, 1930. Serial No. 495,503.

The present invention relates to processes of purifying carbon dioxide gas, and more particularly such a gas containing impurities including water vapor and organic compounds.

Carbon dioxide gas, whether produced by fermentation of molasses, grains, or potatoes and the like or by the combustion of coke and other carbonaceous materials, even after being scrubbed and treated to remove by-products and certain impurities by standard processes, still contains water vapor and other impurities, which must be removed before the gas can be used for solid $CO_2$ or to carbonate beverages. It has been proposed to purify this gas by passing it in succession through masses of solid, porous, adsorbent materials, some of the masses adsorbing water vapor in preference to other fluids and others of the masses adsorbing organic compounds in preference to water vapor.

According to the present invention, we have discovered that the carbon dioxide gas can be purified at elevated pressure by passing it through porous solid adsorbent material, such as hard porous gel material provided the gas is kept in the gaseous phase and most of the moisture is removed before the gas passes through the adsorbent.

In mechanically compressing the gas, lubricating oil used in the compressor becomes associated with the gas. It is almost impossible to remove this oil and any water from the gas if it is compressed to such a stage as to be liquefied, due to the fact that oil and water are soluble in liquid carbon dioxide.

We have discovered that the oil present in the gas can be removed efficiently after the gas has been treated with the adsorbent material by a simple filtering material, such as cotton.

Other objects and features of novelty will be apparent from the description taken in connection with the drawing, in which the single figure schematically illustrates an apparatus for carrying out the process of the present invention.

The raw carbon dioxide gas obtained from any of the usual sources, after scrubbing, is supplied to the first stage of the compressor through the inlet pipe 10. As is usual, the discharge of the first stage delivers to an intercooler 12c, where the compressed gas is cooled by any suitable means, precipitating or condensing some moisture from the gas. From the intercooler 12c the gas goes to the second stage 13 of the compressor and is delivered by pipe 14 to an intercooler 15, where more moisture is condensed. The gas and moisture then pass through the trap 17 where the moisture is collected and drained at 18. From trap 17 the gas flows through pipe 19 to a container having a suitable solid, porous, adsorbing material therein. The object of this adsorbing material is to remove the remaining portion of water vapor and all of the other impurities and odoriferous compounds. Preferably the adsorber is charged with solid, porous gel material such as silica, alumina, tungstia, stannia, or titania gel.

The adsorbent material may be revivified or reactivated when necessary by hot gases or steam supplied through the inlet 21 and discharged, together with the substances driven out of the adsorbent material, at 22. After the adsorbed substances have been liberated from the adsorbent and during adsorption, it may be cooled by supplying a cooling fluid at inlet 21a and discharging the same through the outlet 22a.

From the adsorber the purified gas flows through pipe 23 to the third stage 24 of the compressor. The gas is discharged from this stage through pipe 34 to the cooler 35 and then through pipe 36 and pipes 37 either through filter 38 or 39, the direction of flow being controlled by valves 40 and 41. The filter 38 or 39 is employed mainly to remove oil that has become admixed with the gas during the passage through the compressor. The filter 38 may be charged with cotton, which is found very efficient for this purpose, or other suitable material. The filter 39 may be charged with hard porous gel material such as silica gel, or an adsorbent material which is efficient for adsorbing oils out of a gas, such as charcoal. This mass of adsorbent may be reactivated in the same manner as described in connection with the adsorber 20.

From the filter or adsorber just mentioned the purified gas may flow to a refrigerator 45, the flow being controlled by valves 43 and 49. In the refrigerator the gas is liquefied and delivered by pipe 50 to a storage tank 27. It is highly important that most of the moisture be removed from the gas before it is delivered to the adsorber 20. The intercoolers 12c and 15 perform this function well, but a more efficient cooling can be secured by expanding some of the liquid $CO_2$ into the gas line just before it reaches the adsorber or just prior to the delivery of the gas to the third stage. For this purpose the liquid $CO_2$ might flow through pipe 28, by check valve 26, through pipe 25, to a point ahead of the third stage. Or, if it is desired to introduce the liquid $CO_2$ ahead of the adsorber, the liquid can flow through check valve 33 and pipe 32 into the main line 16 ahead of the trap 17. When the liquid $CO_2$ is expanded into the main line 16 ahead of the trap, a by-pass 30 is provided around the cooler 15. The introduction of the liquid carbon dioxide ahead of the adsorber lowers the temperature of the gas to about 40° F., thereby condensing most of the moisture. Furthermore, the adsorber acts more efficiently because of the lower temperature.

It has been found that if the gas is compressed to such a point that any of it is liquefied, the oil and water dissolved therein cannot be removed by any simple means. Both of the adsorbers 20 and 39 and the filter 38 are efficient only if the $CO_2$ is in the gaseous phase. The introduction of the liquid carbon dioxide ahead of the adsorber or just ahead of the third stage of the compressor keeps the temperatures down so that the lubricating oil in the gas is not cracked in the third stage, and also increases the efficiency of the adsorber. If the oil is cracked by the high temperature in the third stage, it is very difficult to remove all of it from the gas.

Although the invention has been described in connection with an arrangement wherein the adsorbing material is disposed between the second and third stages of the compressor, it is not limited to this, as the adsorbing material might be located between the first and second stages or even after the third stage. Where the pressure of the gas discharged from the third stage is very high and near the point where the gas liquefies, it is safer to locate the main adsorber between the second and third stages, but, if the pressure of the gas discharged from the final stage is sufficiently below the liquefying point, the main adsorber can be located after the third or final stage of the compressor. The adsorption of the odoriferous compounds and remaining small qantity of water is more efficient at the higher pressure provided the $CO_2$ remains in the gaseous phase. In other words, the treatment with the solid porous adsorbent in adsorber 20 should be under such conditions as to temperature and elevated pressure that the $CO_2$ is in the gaseous phase and none is liquefied. This also applies to the treatment in filter 38 or 39. It will be understood that valves are provided wherever required to properly control the flow of the fluids. It should be also understood that adsorbers 20 and filter 39 are each made up of two units that can be used for adsorption and activated alternately.

Having thus described the invention, what is claimed as new and desired to be secured by Letters Patent is:—

1. The process of purifying carbon dioxide gas consisting in compressing the gas, but not sufficiently to liquefy it, expanding liquid carbon dioxide into the compressed gas to cool it and condense moisture therefrom, and then passing the gas through a solid, porous, adsorbent material to remove the remaining water and impurities.

2. The process according to claim 1 with the added step of compressing the gas to a higher pressure but without liquefying it, and passing the same through a filter to take out oil.

3. The process of purifying carbon dioxide gas consisting in compressing the gas, but not sufficiently to liquefy it, cooling the compressed gas to separate moisture, contacting the gas with a solid porous adsorbent material to remove the remaining water and impurities, expanding liquid carbon dioxide into the compressed purified gas, and compressing the gas to a higher pressure.

4. The process according to claim 3 with the added step of removing any oils in the gas.

5. The process according to claim 3 with the added step of removing any oil in the gas by passing the $CO_2$ in the gaseous phase through a filter.

6. The process of purifying carbon dioxide gas consisting in passing the gas in the gaseous phase while under pressure through a solid, adsorbent material to separate water, odoriferous compounds, and other impurities therefrom, cooling the gas to a temperature sufficient to prevent decomposition of any impurities which may be introduced therein during subsequent treatment, subjecting the gas to a higher pressure, and removing the impurities introduced into the gas during the pressure treatment.

7. The process according to claim 6 wherein the adsorbent material is a hard, porous gel.

8. The process according to claim 6 wherein the adsorbent material is a hard, porous silica gel.

9. The process of purifying carbon dioxide gas consisting in removing most of the moisture from the gas, passing the gas in the gaseous phase while under pressure through a solid adsorbent material to separate the remaining water, odoriferous compounds and other impurities therefrom, cooling the gas to a temperature sufficient to prevent decomposition of any impurities which may be introduced therein during subsequent treatment, subjecting the gas to a higher pressure, and removing the impurities introduced into the gas during the pressure treatment.

10. The process according to claim 9 wherein the adsorbent material is a hard, porous gel.

11. The process according to claim 9 wherein the adsorbent material is a hard, porous silica gel.

12. The process of purifying carbon dioxide gas consisting in compressing the gas, removing most of the moisture from the gas, passing the compressed gas through a hard, porous adsorbent material to separate the remaining water, odoriferous compounds and other impurities therefrom, cooling the gas to a temperature sufficient to prevent the decomposition of any oil which may be introduced therein during subsequent treatment, compressing the gas to a higher pressure, and passing the gas through a material to extract the oil introduced into the gas during compression.

13. The process according to claim 12 wherein the oil extracting material is cotton.

14. The process according to claim 12 wherein the adsorbent material is a hard, porous gel.

15. The process according to claim 12 wherein the adsorbent material is a hard, porous silica gel.

16. The process of purifying carbon dioxide gas consisting in compressing the gas but not sufficiently to liquefy it, removing most of the moisture from the gas, passing the compressed gas through a hard, porous adsorbent material to separate the remaining water, odoriferous compounds and other impurities therefrom, cooling the gas to a temperature sufficient to prevent the decomposition of any oil which may be introduced therein during subsequent treatment, compressing the gas to a higher pressure, and passing the gas through a material to extract the oil introduced into the gas during compression.

17. The process according to claim 16 wherein the oil extracting material is cotton.

18. The process according to claim 16 wherein the adsorbent material is a hard, porous gel.

19. The process according to claim 16 wherein the adsorbent material is a hard, porous silica gel.

In testimony whereof we hereunto affix our signatures.

SIDNEY T. ADAIR.
CHARLES F. CUSHING.